US 6,731,805 B2

(12) United States Patent
Brodsky et al.

(10) Patent No.: US 6,731,805 B2
(45) Date of Patent: May 4, 2004

(54) METHOD AND APPARATUS TO DISTINGUISH DEPOSIT AND REMOVAL IN SURVEILLANCE VIDEO

(75) Inventors: Tomas Brodsky, Croton on Hudson, NY (US); Miroslav Trajkovic, Ossining, NY (US); Robert A. Cohen, Chappaqua, NY (US); Damian M. Lyons, Pumam Valley, NY (US); Eric Cohen-Solal, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 632 days.

(21) Appl. No.: 09/819,779

(22) Filed: Mar. 28, 2001

(65) Prior Publication Data

US 2002/0141637 A1 Oct. 3, 2002

(51) Int. Cl.$^7$ .............................. G06K 9/48; G06K 9/68; H04N 7/18
(52) U.S. Cl. ..................... 382/199; 382/218; 348/143
(58) Field of Search ................................ 382/103, 168, 382/170, 172, 173, 199, 218; 348/135, 142, 143, 151, 152, 153, 154, 155, 159, 161

(56) References Cited

U.S. PATENT DOCUMENTS

| | | | | |
|---|---|---|---|---|
| 3,828,125 A | * | 8/1974 | Fagan et al. | 348/155 |
| 3,885,090 A | * | 5/1975 | Rosenbaum | 360/5 |
| 4,999,614 A | | 3/1991 | Ueda et al. | 340/588 |
| 5,880,775 A | | 3/1999 | Ross | 348/143 |
| 5,969,755 A | | 10/1999 | Courtney | 348/143 |
| 6,049,363 A | | 4/2000 | Courtney et al. | 348/700 |
| 6,097,429 A | * | 8/2000 | Seeley et al. | 348/154 |
| 6,104,831 A | | 8/2000 | Ruland | |
| 6,263,088 B1 | * | 7/2001 | Crabtree et al. | 382/103 |
| 6,424,370 B1 | * | 7/2002 | Courtney | 348/143 |
| 6,476,858 B1 | * | 11/2002 | Ramirez Diaz et al. | 348/159 |
| 6,496,592 B1 | * | 12/2002 | Lanini | 382/103 |
| 6,504,479 B1 | * | 1/2003 | Lemons et al. | 340/541 |
| 6,570,499 B2 | * | 5/2003 | Kaganer | 340/541 |
| 6,678,395 B2 | * | 1/2004 | Yonover et al. | 382/103 |

FOREIGN PATENT DOCUMENTS

JP          1066054          3/1998          ............ H04N/7/18

OTHER PUBLICATIONS

Nalwa, Vishvjit S., *A Guided Tour of Computer Vision*, Addison–Wesley Publishing Company, 1993, pp. 80–84.
Chakraborty et al, "Deformable Boundary Finding Influenced by Region Homogeneity", IEEE, 1994, pp. 624–627.
Wei Jyh Heng et al, "Integrated Shot Boundary Detection Using Object–Based Technique", Image Processing, Oct. 24, 1999, pp. 289–293.

* cited by examiner

*Primary Examiner*—Andrew W. Johns
*Assistant Examiner*—Amir Alavi
(74) *Attorney, Agent, or Firm*—Gregory L. Thorne (57) ABSTRACT

A system and method that detects and identifies an event from a sequence of images received. The system comprises a control unit that receives and processes the sequence of images from the camera. The control unit identifies at least one stationary image prior to the event and one stationary image subsequent to the event. The control unit compares one or more representations corresponding to one or more edges in the first stationary image with one or more representations corresponding to one or more edges in the second stationary image to determine whether an object has been deposited or removed during the event.

33 Claims, 4 Drawing Sheets

METHOD AND APPARATUS TO DISTINGUISH DEPOSIT AND REMOVAL IN SURVEILLANCE VIDEO

FIELD OF THE INVENTION

The invention relates to identifying events in surveillance video, including deposit and removal of objects.

BACKGROUND OF THE INVENTION

Surveillance video is used in many settings, most notably for security. A typical surveillance video is directed at a location in order to protect the objects in the location from being stolen, to guard against intruders, etc. For example, surveillance videos are found in warehouses to protect a business against a theft of its property, in the parking lots of shopping centers to protect against car theft and robberies, etc.

In some settings, a live person monitors the video camera (or video cameras for different locations) to provide real-time theft or other crime prevention. This type of scenario is typically found in office buildings, parking garages, banks, etc. Such real-time monitoring is often supplemented by recording the images captured by the video camera(s) on video tape or other media. This allows an event to be reviewed in the event that the human monitor fails to see a crime in real-time, or if evidence is needed to investigate or prosecute the crime.

In some settings, real-time monitoring is unnecessary or uneconomical. For example, when guarding against theft of inventory in a warehouse, the cost of real-time monitoring may exceed the average cost of theft. In such cases, the video recording of the scene alone may be used. This provides deterrence against thefts and other crimes (since a would-be perpetrator can typically see the cameras or there are signs warning of them), and also provides a recording of a crime that can be used in an investigation and/or prosecution.

Particular methods and systems have been developed that attempt to automatically identify certain events as they occur in a video image. This may allow the pertinent segments of a video tape recording of the location to be electronically flagged or "indexed" with the corresponding event. For example, events that are typically desirable to be identified and indexed include entrance of a person or object into the scene being surveilled, exit of an object or person from the location, and deposit and removal of an object from the location.

Such indexing allows faster review of certain events that occurred over a number of hours of video tape, for example, after a theft or other crime has occurred. If, for example, a theft of a computer has occurred, the index may be used to quickly review all "removal" events identified in the video tape. This may help speed an investigation, for example.

It may be noted that such indexing is helpful even if the video tape for a location has numerous indices of events such as deposits, removals, entrances and exits. For example, in an active warehouse, there may be hundreds of the above events over the course of a number of hours of video surveillance and taping. However, when a crime occurs, it is nonetheless helpful to focus on the particular class of events (such as "removal" of items), rather than attempt to review the entire tape (or other recording media) for the number of hours. Identification of such events may also supplement real-time monitoring of the scene. Particular events (such as "entrance" of an object or person to the location) may initiate an audio alert to the person monitoring the location.

U.S. Pat. No. 5,969,755 to Courtney, the contents of which are hereby incorporated by reference, describes a particular motion based technique for automatically identifying particular "content based" events in video received from a surveillance camera and indexing the video with such events. A video image is divided into segments and video-objects ("V-objects") are identified in the segments by comparing a reference image with the current image, performing morphological operations and identifying change regions that make up the V-objects. V-objects are tracked between received video frames, thus providing updated position and an estimation of velocity. Using position and estimated velocity, V-objects may also be tracked from one segment of the image to another. Courtney applies certain rules to video segments to identify events.

For example, according to the rules of Courtney, where a tracking sequence between frames of a V-object indicates that it begins (has a track "head") at a particular frame and remains stationary in subsequent frames, and a track of a moving V-object crosses the track of the stationary object in the frame prior to the head of the stationary track, then the moving V-object is identified as a "depositor" and the head of the stationary track is identified and indexed as a "deposit" of an object. Similarly, if a tracking sequence between frames of a V-object indicates that it is stationary and ends (has a track "tail") at a particular frame, and a track of a moving V-object crosses the track of the stationary object in the frame after the tail of the stationary track, then the moving V-object is identified as a "remover" and the tail of the stationary track is identified and indexed as a "removal" of an object.

One problem with the Courtney technique is misidentification of removal of an object that has been in the scene to begin with. The Courtney technique may identify such a removal as a deposit. In effect, the system may detect a stationary change region or stationary "hole" in the image at the point where the object is removed. The principle cause is that the object is not seen (or recognized) by the system prior to the removal, and thus processes it as part of the reference frame. This stationary change region that arises in the image may thus be classified as a deposit, even though an object has been removed. Courtney itself recognizes this disadvantage at col. 6, lines 47–51.

In addition, the technique of Courtney relies on identifying, estimating and tracking motion and velocity of multiple objects, and its rules apply to the interaction of the tracking of one object in relation to another. Such estimating and tracking of multiple objects with respect to each other in an image is relatively complex and may give rise to a relatively high rate of incorrect detection and/or identification of events.

Another technique applied to determine a change in a scene is described in U.S. Pat. No. 6,049,363 to Courtney et al. ("Courtney II"), the contents of which are hereby incorporated by reference. Courtney II focuses on determining the presence of an object in one image and the absence of the object in another image. For images comprised of pixels in the case of "TV data", corresponding pixels for two separate images are subtracted to identify a "change region" corresponding to an object in one of the two images. Pixels identified as edges in the two images are then each compared with corresponding border pixels in the "change region" in the image. Where the compared pixels between an image and the change region have a high incidence of correspondence, the object is identified as being present in that image.

Courtney II concedes that image edges are not easily detectable in infrared images. Thus, for infrared images, Courtney II identifies a change region using the two separate images and then determines the variance of pixel intensities within the change region of the two separate images. Based on a "contrasting halo" found in the images of objects in IR cameras, the object is determined to be in the image having the greatest intensity variance.

Many difficulties arise from the Courtney II technique of comparing two images directly to generate such a change region, and then further comparing the two images with the change region itself. For example, slight movement of the video camera, or diffuse edges in the images, can result in a change region having a border that does not correspond to the edges in either of the two images. In addition, lighting differences between the two separate images may give rise to a myriad of false "change regions" and then an equally false "match" between the border of such a false change region and one of the images. The infrared camera technique relies on an aberration in the optics of an IR camera and which may not actually arise in better quality IR cameras.

SUMMARY OF THE INVENTION

Among other things, it is an object of the invention to provide a highly accurate system and method for detecting events in surveillance video and images. It is an addition objective that the system and technique provides for reliable detection of important events, such as removal and deposit, without a high incidence of incorrect identifications of such events. It is also an objective that the system and method are implemented in a relatively simple and straightforward manner.

The system and method may itself provide detection of events or changes to the location, as well as accurate identification of whether an object has been deposited or removed in a changed location. Alternatively, the system and method may be used to provide supplemental analysis to existing techniques and methods that detect events and attempt to identify the type of event. When used as a supplemental analysis, an existing technique (such as in the Courtney patent) may be used to detect an event in the image and even an identification of the type of event, such as removal or deposit. The technique of the invention may then be used to analyze the event further, to provide a more reliable indication of event detection and/or identification of the type of event.

In accordance with these objectives, the invention provides a method and system of reliably identifying events in surveillance video and images by creating an outline of objects in the location from at least one received image. The edges detected in a subsequent image are compared with the outline. When an object is deposited in the location, there will be more edges in the subsequent image than in the outline. When an object is removed from the location, there will be less edges in the subsequent image than in the outline. Thus, deposits and removal of objects from the location may be accurately identified and indexed. In addition, the outline may be updated after each detected deposit and removal in order to accurately reflect the new background scene. Additionally, the outline and the subsequent images may be divided into segments and separately compared.

The edges detected in a subsequent image may be compared with the outline by determining whether edge segments are present or absent in the corresponding portion of the outline. Alternatively, it may be determined whether edge segments corresponding to an object (comprising a closed loop of edges) are present or absent in the corresponding portion of the outline. (Templates of objects as determined by the edge segments may be compared with the outline, or vice versa.) If there are more edge segments in the subsequent image than in the outline, then there is a deposit. If there are less, then there is a removal. Templates of objects as determined by the edge segments may be compared with the outline. Where a template does not match the outline, there is a deposit. Where there is no template to match an object in the outline, a removal has occurred. The templates may alternatively be determined from the outline and compared with the edge segments.

In addition, the edges detected in a subsequent image may be compared with the outline by determining the length of the edges (through integration or other image processing) in the subsequent image and comparing it with the length of the curves in the outline. If the length of the edges in the subsequent image is greater than in the outline, there is a deposit event. If less, then there is a removal event.

The above described technique may be used to detect a location changing event itself, as well as identify the event as a removal or deposit. It may alternatively be used as a supplemental analysis that provides verification of the detection of an event and identification of the type of event for an existing technique that detects a location changing event.

Another embodiment of the invention provides a technique for supplemental analysis that provides identification of the type of event after a deposit or removal event has been detected. Existing techniques (such as described in the Courtney patent) or techniques of the present invention that detect the event will also provide the boundary location of the deposited or removed object in the image after the event has occurred. To identify a deposit or removal event, the image gradient of the post-event image is integrated along the boundary location of the object. If the image gradient integral is below a threshold, indicating continuity along the boundary of the location of the object in the post-event image, then a removal is indicated. If the image gradient is above a threshold, indicating an edge along the boundary of the location of the object in the post-event image, a deposit is indicated.

Instead of using a threshold, the image gradient of a pre-event image is integrated along the boundary of the location of the object and the pre-event image gradient integral is compared with the post-event image gradient integral. If the pre-event image gradient is larger, indicating an edge along the boundary of the location of the object in the pre-event image, a removal is indicated. If the post-event image gradient integral is larger, indicating an edge along the boundary of the location of the object in the pre-event image, a deposit is indicated.

If the pre- and post-event image gradient integrals are substantially equal, then the result may be inconclusive. For example, equal image gradient integrals could arise if there is no deposit or removal of an object. Equal image gradient integrals could alternatively arise if a new object having the same dimensions is deposited between the camera and the object in the pre-event image. Equal image gradient integrals could also arise if an object is removed but its removal uncovers (to the camera) a previously obscured object that has the same dimensions. Thus, if the pre- and post-event image gradient integrals are substantially equal, the event may be indexed generically as an "object-moved" event.

Still another embodiment of the invention provides a technique for supplemental analysis that provides identification of the type of event after a deposit or removal event and its boundary location in the image is detected, For either or both of the pre-event and post-event images, the color and texture inside the boundary location in the image is compared with the color and texture outside the boundary location. If the color and texture inside and outside the boundary are substantially similar in the post event image (indicating a continuous image), for example, then the event is a removal event. If the color and texture inside and outside the boundary location are substantially different in the post event image, then a deposit event is recorded. Analogous comparisons and identification of the event may be made in the pre-event image. Both pre- and post-event images may be used together in the determination. Color histograms of the event location and the surroundings may be used to determine the degree of similarity and dissimilarity between the regions for the pre- and post-event images.

DETAILED DESCRIPTION

Figure 1:
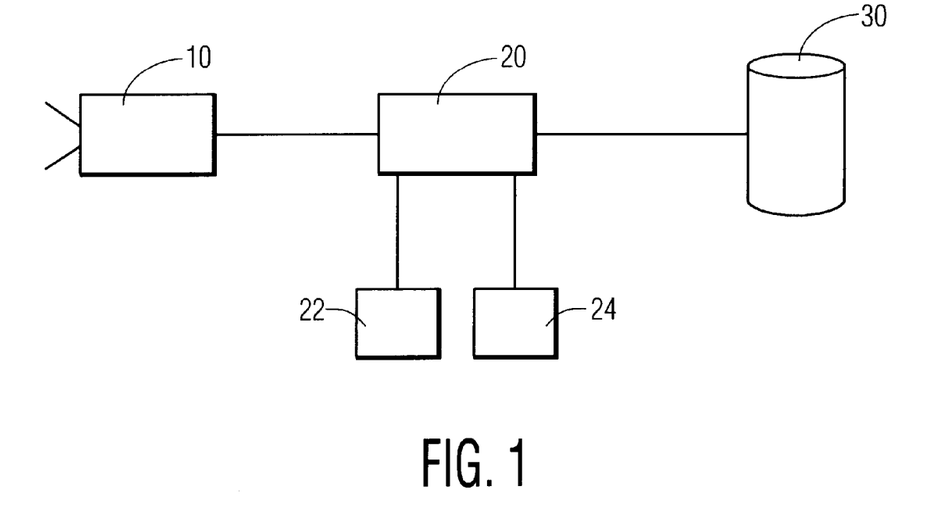
FIG. 1 is a block diagram of a system that supports the present invention.

FIG. 1 depicts the components of a typical video surveillance system that supports the present invention. A camera 10 is trained on a location to be surveilled, and provides images to a control unit 20. The camera 10 may be a digital video camera or other digital camera. For a digital camera 10, the camera provides the control unit 20 with a sequence of digital images of the location that may be compressed. Each digital image comprises digital data corresponding to an array of pixels used to recreate and display the image. For an analog camera 10, the control unit 20 may provide an analog to digital processing of the received images that is then used in the processing, indexing and storage described below.

Control unit 20 includes one or more processors, system software and hardware, memory and application software that supports the automatic event detection and identification processing (including indexing of events) of the embodiments of the invention described in detail below. The control unit 20 may also include related image and other processing, such as the A/D converter when an analog camera 10 is employed, as described above, compression, decompression, etc.

Memory 30 is used to store the processed images received from the control unit 20. The stored images may be indexed with detected events (including an identification of the type of event) for later retrieval. Memory 30 may be any appropriate recording media, including a hard drive, disk, video tape (including a digital video tape), or volatile memory/RAM. The images may be retrieved in sequence from the memory 30 and used to reconstruct the video sequence captured by the camera 10. Alternatively, the memory 30 may be searched for a particular type of event as identified by the indexing of the image frames by the processor (and described in more detail below).

Playback of the video images and/or searching for one or more images (or sequences of images) having an index indicating that it captures a particular type of event may be initiated by a viewer using a GUI 22 that interfaces with the control unit 20. Control unit 20 than searches for the particular index (where applicable), processes the images for display and provides the pertinent sequence of images to the user via display 24. A separate control unit that interfaces with the memory 30 may provide the searching and retrieval of images for display.

Figure 2A:
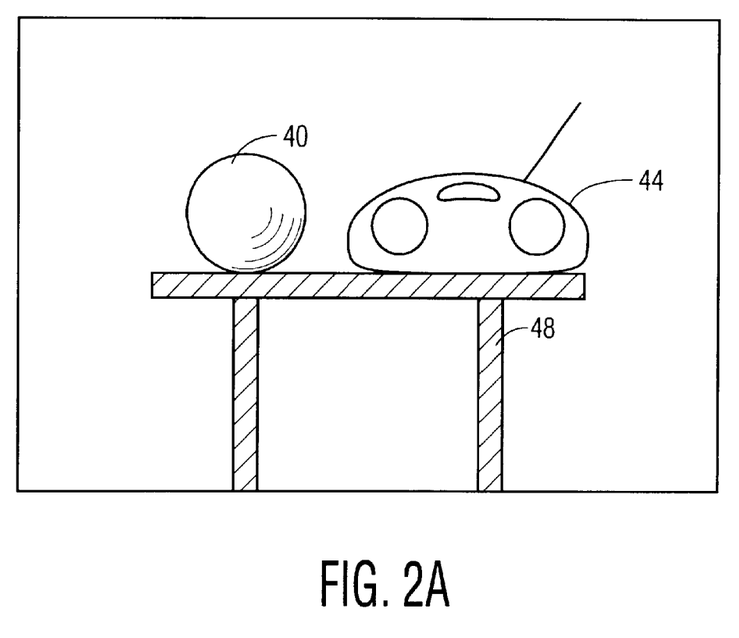
FIGS. 2a and 2b are stationary images of a location captured by a video camera processed by embodiments of the present invention to identify an event.
Figure 2B:
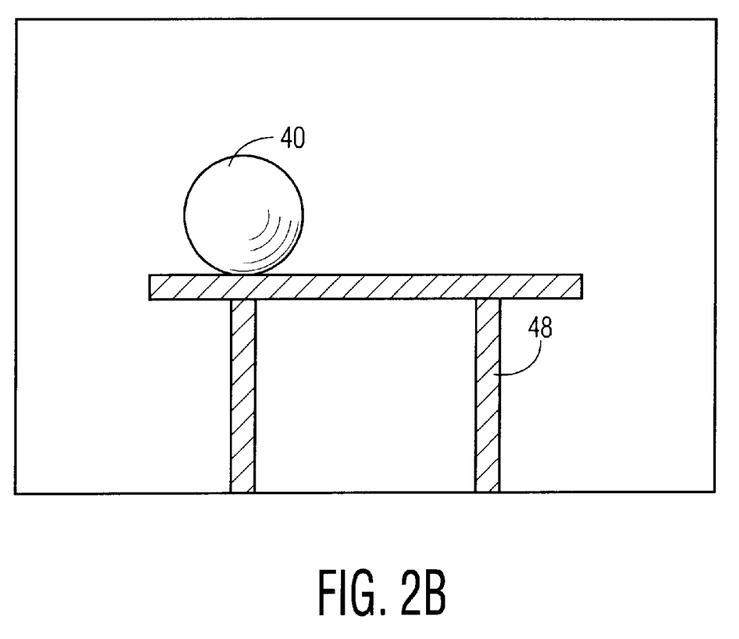

FIGS. 2a and 2b represent two stationary images captured by camera 10 at different times. The physical region over which the camera is trained will generally be referred to as the "location", and is the same for FIGS. 2a and 2b. The images captured of the location may be different, as shown in FIGS. 2a and 2b. The images may also be referred to as the "scene" or like term. The image of FIG. 2a is captured at a time $t_a$ and includes a ball 40 and a radio 44, both of which are supported by a table 48. The image of FIG. 2b taken at a time $t_b$ and includes only the ball 40 supported by the table 48. Thus, if the image of FIG. 2a precedes the image of FIG. 2b in time (i.e., $t_a<t_b$), then the radio 44 has been removed from the location between FIG. 2a and FIG. 2b. On the other hand, if the image of FIG. 2b precedes the image of FIG. 2a in time (i.e., $t_b<t_a$), then the radio 44 has been deposited in the location between FIG. 2b and FIG. 2a. Images such as FIGS. 2a and 2b are generally comprised of an array of pixels that are processed by the control unit 20.

FIGS. 2a and 2b are now utilized to describe a first embodiment of the invention. The first embodiment may be used to both detect an event, for example, a removal or deposit of an object in the scene, and identify the type of event as either a removal or deposit. In the ensuing description, a removal event will be focused on, in this case the radio 44 of FIG. 2a. Thus, the image of FIG. 2a is the scene before the radio 44 is removed and FIG. 2b is the scene after the radio is removed.

An event is comprised of objects (including people) moving in the location and thus in the sequence of images captured during the event. Before and after the event, the scene is often substantially stationary, even if only for a brief period of time. During an event there is motion in the image. Thus, FIG. 2a may be conceived as the stationary image sometime before the event that includes removal of the radio 44 and FIG. 2b the stationary image after the event.

The control unit 20 may include motion detection software that detects motion in the image. For example, the control unit 20 may employ well-known motion segmentation techniques to detect motion in the image (or, equivalently, at the location). When no motion is detected, the control unit 20 creates an outline of the current stationary image. Thus, using the stationary image of FIG. 2a that precedes the removal event (and thus detected motion), the control unit 20 creates an outline of the features and objects of the image as shown in FIG. 3a.

Figure 3A:
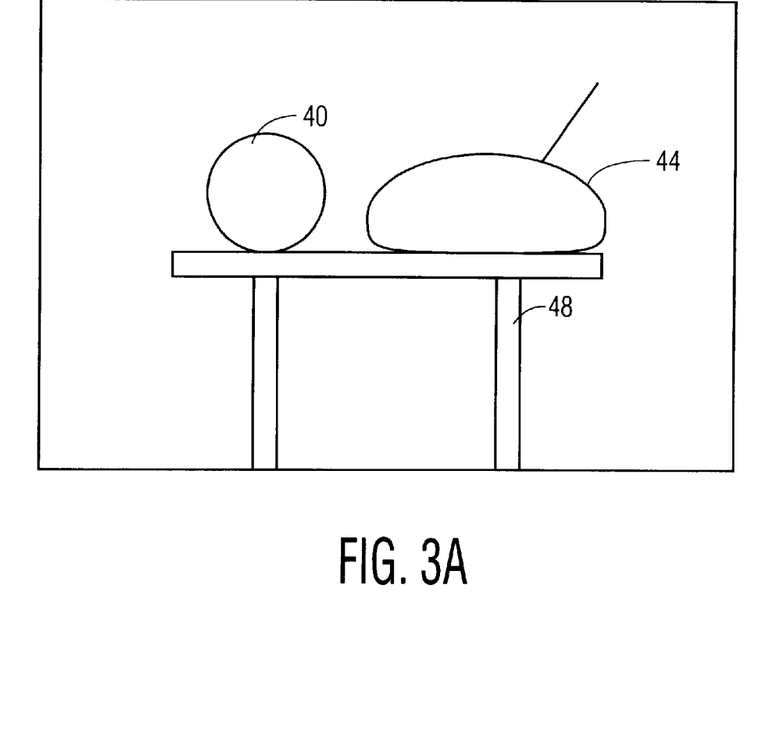
FIG. 3a and 3b are outlines of the stationary images of FIGS. 2a and 2b, respectively.

The outline of FIG. 3a is a more skeletal representation of the image of FIG. 2a. It may be created, for example, by applying edge detection processing in the control unit to the pixel array comprising FIG. 2a. The outline of FIG. 3a is also comprised of an array of pixels in the control unit 20 and is temporarily stored, for example, in a RAM memory in the control unit 20. When motion is subsequently detected in the images by the control unit 20 and is then followed by a stationary image as in FIG. 2b, the control unit 20 then identifies edges in the subsequent stationary image. The detected edges of the image of FIG. 2b only include those of the table 48 and the ball 40.

It is noted that, in general, edge detection may also detect edges inside the objects (as a result of the object's texture, for example), in addition to the edges that represent the boundary or perimeter of the object. However, the edges for the outline and the boundary portions of objects in the subsequent stationary image may be identified (for example) by detecting a change region via comparison with a reference frame or by using known background modeling. (Although using a change region of a reference will not identify an object that is originally in the reference frame and remains stationary in both the prior and subsequent stationary images, the omission will not be significant since the object has been neither removed nor deposited. If an object originally in the reference frame is removed during the event, a change region will arise in the subsequent stationary image.)

The edges of the stationary image (i.e., of FIG. 2b) that follows a detected motion are compared with the outline of the stationary image preceding the motion. Since there are no edges in FIG. 2b that match the outline of the radio 44 in the outline of the preceding stationary image of FIG. 3a, the control unit 20 concludes that the event is a removal of the object in the position of the radio 44.

The comparison of the edges detected in the subsequent stationary image with the outline of the prior stationary image by the control unit 20 may proceed in a number of ways. At a simple level, the pixels comprising the various edges of the subsequent image may be identified and the corresponding pixels of the outline may be retrieved to determine if they comprise part of the outline. If not, then there are edges in subsequent image that are not found in the outline of the prior stationary image, indicating a new object exists in the subsequent image, or a deposit event. The control unit 20 may also keep track if the entire outline of the prior image is matched by the edges in the subsequent image. If not, then there are no edges in the subsequent image corresponding to part of the outline of the prior stationary image, indicating a removal event.

Thus, in the example, the control unit 44 would determine that the subsequent image of FIG. 2b does not have edges that correspond to the outline of the radio 44 in FIG. 3a, indicating a removal of the radio 44.

Instead of using corresponding pixels between images to compare edges in the subsequent stationary image with the outline of the prior stationary image, each edge in the subsequent image and its location in the image may be identified by the control unit 20. The corresponding location, including its surroundings, in the outline of the prior stationary image is analyzed for a like feature. The surrounding area of the outline may be a certain number of pixels surrounding the pixels in the outline of the prior stationary image that correspond to the edge in the subsequent image. A like feature in the outline may be determined by how well the edge maps onto the detected outline feature.

Alternatively, an edge or edges that form a closed loop surrounding an area in the subsequent image and which are identified as a change region (by comparison with a reference image or background modeling) may be identified by the control unit 20 and may be used to create a template. The template is positioned in the same location of the outline of the prior stationary image. If the pixels comprising the area of the template (i.e., within the closed loop of edges) covers a certain percentage of an area within a closed loop of pixels in the outline, then the control unit 20 concludes that there is correspondence for those features. The template is, of course, is created internally by the control unit 20 by keeping track of the pixels comprising the edge(s) and their memory locations. The template is "positioned" at the same location of the outline internally by the control unit 20 by comparing pixels of the template with pixels of the outline. The processing is repeated for all templates comprised of edges that form a continuum in the subsequent image.

Once again, if there are templates in the subsequent image that are determined by the control unit 20 not to be in the outline of the prior stationary image, the control unit concludes there has been a deposit event. The control unit 20 also keeps track of whether the entire outline of the prior image is matched by the templates of the subsequent image. If not, then the control unit concludes there has been a removal event.

Alternatively, the control unit 20 may integrate the net length of the curves comprising the outline of the prior stationary image, thereby calculating a first integrated length value. The control unit 20 may then integrate the net length of the curves comprising the boundary edges identified in the subsequent stationary image, thereby calculating a second integrated length value. If the first integrated length value is greater than the second integrated length, then there are less edges in the subsequent image than in the outline of the prior image, thereby indicating a removal event. If the second integrated length value is greater than the first integrated length value, then there are more edges in the subsequent image than in the outline of the prior image, thus indicating a deposit event.

The control unit 20 may integrate the edges and curves of the outline by assigning a representative distance between adjacent pixels in the edge or the curve. Diagonally adjacent pixels may be assigned a larger distance than pixels that are immediately adjacent (that is, above, below, left or right). Using the known pixel locations of the edges in the subsequent image, the control unit 20 may add the representative distances between all of the pixels, thus calculating the first integrated length value. In like manner, using the known pixel locations of the curves in the prior image, the control unit 20 may add the representative distances between all of the pixels, thus calculating the second integrated length value. By comparing the first and second integrated length values, the control unit determines which is larger and thus whether there is a removal event (first integrated length value greater than second integrated length value) or a deposit event (second integrated length value greater than the first integrated length value).

Figure 3B:
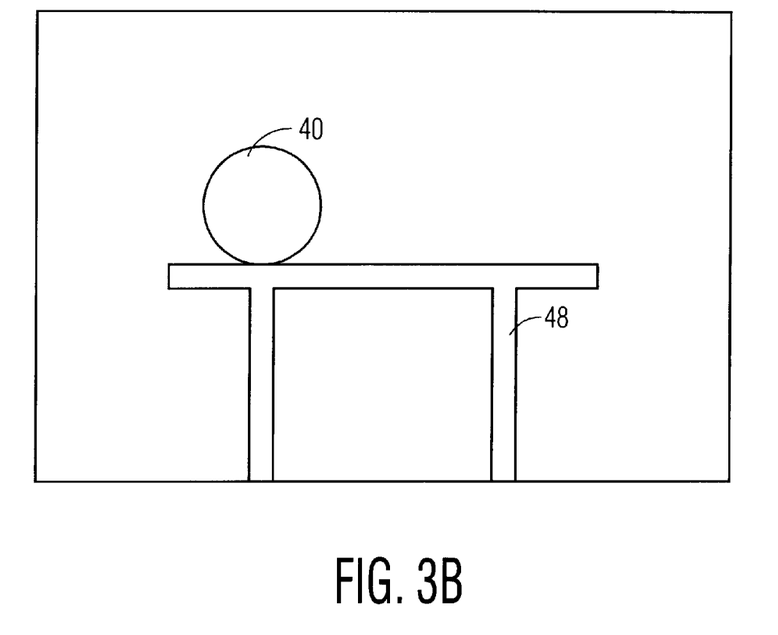

Returning to the above example, the first integrated length value of the outline of prior stationary image of FIG. 3a will be larger than the second integrated length value of the edges detected in the subsequent stationary image of FIG. 3b. Thus, after calculating and comparing the two integrated length values, the control unit 20 will conclude that a removal event has occurred.

The integration technique may be modified by applying it to sectors of each image, thus allowing the control unit 20 to identify the portion of the image in which a deposit or removal event has occurred. Alternatively, the control unit 20 may apply the integration technique to those edges and curves in each image that form a continuous and closed path and which are identified as a change region using either a reference image or known background modeling (and which thus each indicate an individual object). The various integrated values for the closed curves in the outline of the prior stationary image and closed edge or edges of the second stationary image may be compared between images. If an integrated value for a closed curve of the outline is sufficiently close (within a certain percent, for example) to an integrated value for a closed edge(s) in the second image, as noted above the control unit 20 determines that the type of event is inconclusive and simply indexes the event as including a moved object. If an integrated value for an object exists in the curves of the prior stationary image, but not amongst the edge or edges comprising an object in the second stationary image, then the control unit 20 concludes that there was a removal of the identified object. On the other hand, if an integrated value for an object is found among the edge(s) comprising an object in the second stationary image, but not in the curves of the prior stationary image, then the control unit 20 concludes that there was a deposit of the identified object.

As described in the general description of the embodiments above, if the subsequent stationary image is determined using any of the particular techniques to have more edges than the outline of the prior stationary image, then the control unit 20 determines that a deposit event has occurred. For example, if the image of FIG. 2b is prior to the image of FIG. 2a, then the outline of the prior stationary image is as shown in FIG. 3b. By comparing the outline of the prior stationary image of FIG. 3b with the edges detected in the subsequent stationary image of FIG. 2a using any of the manners described above, the control unit 20 determines that the number of edges in the subsequent stationary image is greater than the curves of the outline of prior stationary image. The control unit 20 thus concludes that there is a deposit, in this case, of radio 44.

It should be noted that while an event implies that there is motion in the scene, a particular event does not necessarily result because of motion. For example, motion within an image may comprise a person walking across the image, without removing or depositing any of the objects in the image. Thus, there are entrance and exit events involved with the motion, but not deposit or removal events. In this case, the stationary image following the event will be identical to the one before the event, and the edges of the subsequent stationary image will completely (or substantially) match the curves of the outline using any of the comparison techniques described above. As in the cases described above, the control unit 20 determines that the type of event is inconclusive and simply indexes the event as including a moved object.

As described, the above embodiment first detects events and then identifies a deposit or removal event by processing and comparing an outline of a stationary image prior to the event with detected edges in a stationary image subsequent to the event. As first introduced above, detection of the event itself was provided by application of known motion detection processing to the sequence of captured images, and then analyzing stationary images prior and subsequent to the event using the above-described embodiment of the invention.

The processing provided by the embodiment may itself be adapted to first detect an event and then to identify the type of event. Thus, for example, the control unit 20 may select a first image from an incoming sequence of images and, presuming it is a stationary image, create an outline for the image as described above. At regular intervals of time thereafter (for example, a time interval shorter than it would take a person, vehicle, etc., to move through the location of the image), the control unit 20 selects a subsequent image from the sequence, analyzes the edges and compares it with the outline of the first image in any of the manners of the embodiment described above. For example, the control unit 20 may integrate and compare the net length of the outline of first image and the edges of the subsequent image.

If the net length (or other manner of comparison) is equal between the first and a subsequent image, then the control unit 20 concludes that the image has remained stationary. The control unit 20 continues (at successive time intervals) to select and analyze subsequent images from the sequence and compare each subsequent image with the outline of the first image. Once a difference is detected in the net length between the outline of the first image and the edges of a subsequent image, the control unit 20 concludes that there is motion in the image (i.e., that an event is in progress). At that point, the control unit 20 keeps track of the difference in net length between the outline of the first image and the edges of subsequent images selected and analyzed. Once the control unit 20 determines that the difference in net length is no longer changing, then it concludes that the last subsequent image selected also represents a stationary image.

Having determined both a stationary image prior to an event (i.e., the first image) and a stationary image subsequent to the event, the control unit 20 identifies the event as a removal or deposit (or inconclusive) using any of the manners of the above-embodiment. After the event is identified, the control unit 20 replaces the first stationary image with the identified subsequent stationary image and then continues to process the incoming sequence of images to detect an event.

As noted, it was initially assumed that the first image selected by the control unit 20 was stationary. If the control unit 20 does not know whether the initial image selected as the first image is stationary, it may compare the initial first image with subsequent images in the manner described above until there is no change in the difference in net length between the first image and a subsequent image. The subsequent image is thus stationary and the control unit 20 substitutes it as the first image and then continues processing in the manner described.

The other manners of identification of events of the above embodiments (such as edge comparison and templates) may in like manner be applied to event detection as well as event identification.

Alternatively, the identification of events according to the embodiment may be used to supplement other detection and/or identification techniques. For example, the technique of the Courtney patent referred to in the Background section may first be applied to detect the occurrence an event. Courtney also purports to identify types of events, including deposit and removal events. However, as described above, Courtney's identification of deposit and removal events may be incorrect. Thus, the above embodiment of the invention may be applied to stationary images that are recorded before and after the event as detected and first analyzed by the Courtney technique. This supplementary analysis provides accurate identification of a deposit or removal event.

Finally, after the event is analyzed and, if applicable, a deposit or removal event is identified, then the subsequent stationary image is used by the control unit 20 to generate a new outline that is stored as the prior stationary image for the next detected event. The control unit 20 thus maintains an updated image of the stationary scene.

An alternative embodiment of the invention provides an analysis of an event that has been detected and identified within the control unit 20 as either a removal or deposit event. For example, when used as a supplementary identification analysis, the analysis of the alternative embodiment may be applied as a supplementary identification analysis for the detection and identification technique of the first embodiment above (that relies on comparing an outline of a prior stationary image with the edges detected in a subsequent stationary image). As another example, the technique of Courtney may be applied to detect an event and provide an identification of the event as either a deposit or removal event. As noted, the identification of the event as either a deposit or removal by the Courtney technique may not be accurate in some cases and it thus may be desirable to apply a supplementary analysis that provides a more accurate identification.

Figure 4:
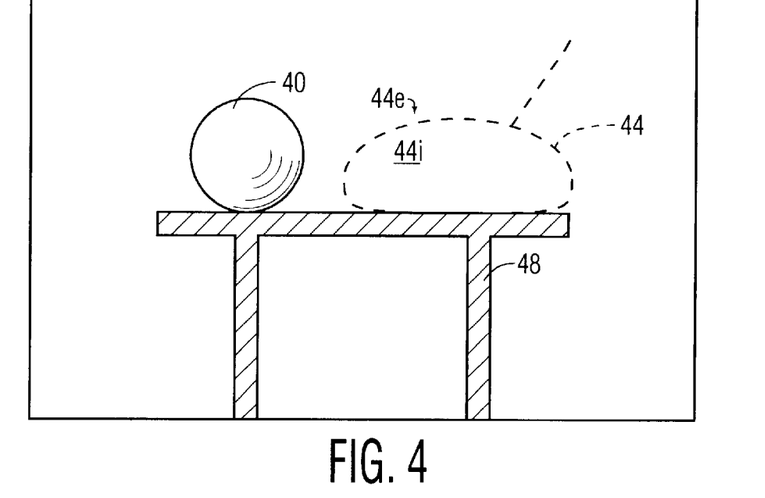
FIG. 4 is a stationary image of the location as shown in FIGS. 2a and 2b, wherein an object represented by a dashed line has been detected as either deposited or removed.

The supplementary identification application of the alternative embodiment will be focused on first. Thus, prior to applying the supplementary analysis of the alternative embodiment, the control unit 20 has previously analyzed images comprising an event and has at least identified an object as being either deposited or removed during the event. Accordingly, the control unit 20 knows where the object is in the image (i.e., the boundary) and must determine (or confirm) whether it was either deposited or removed. FIG. 4 is a stationary image identified by the control unit 20 subsequent to the event. As noted, the control unit 20 has already identified the location of the deposit or removal event. In this case, the control unit has identified the boundary of the radio 44 as being an object that was either deposited or removed during the event; thus, the radio is represented in FIG. 4 with dashed lines. If the radio 44 has been deposited in the event, then the radio 44 and it's identified boundary is part of the image in FIG. 4 (i.e., a solid image, like the ball 40 and table 48). If the radio has been removed, then there is no object in the image corresponding to the radio 44 or its boundary.

To determine whether there has been a deposit or removal of the object at the identified boundary, the control unit 20 performs an integration of the image gradient along the dashed lines in the image corresponding to the determined boundary of the object. The image gradient is a vector that points in the direction of the maximum rate of change of the image intensity at each point in the image. The magnitude of the image gradient vector at each point is equal to the maximum rate of change of the image intensity at that point. Thus, the image gradient along the boundary of an object in an image will be relatively large in magnitude, since the boundary of an image represents a relatively abrupt change in the image intensity. On the other hand, the image intensity along a line in the image that does not correspond to a boundary of an object will be relatively continuous; thus, the image gradient will be relatively small along such a line.

Thus, if the radio is present in the subsequent image (i.e., a deposit event), then the boundary of the radio exists in the image and the image gradient will be relatively large at the boundary. Consequently, the integral of the image gradient along the dashed lines of the image will be relatively large. If the radio is absent from the subsequent image (i.e., a removal event), then the image gradient will be relatively small along the dashed lines representing the former boundary of the removed radio. Consequently the integral of the image gradient along the dashed lines will be relatively small.

The control unit 20 thus determines and integrates the image gradient along the dashed lines of FIG. 4. The gradient is a vector ($I_x$, $I_y$), where $I_x$ is the derivative of the image function along the x direction and $I_y$ is the derivative along the y direction. Computation of $I_x$ and $I_y$ is well known in the art and typically involves the steps of blurring the image and then applying derivative operators (such as a Sobel operator) in the x and y directions. Techniques of determining such image gradients are described in Vishvjit S. Nalwa, *A Guided Tour Of Computer Vision*, Addison-Wesley (1993), the contents of which are hereby incorporated by reference. (In particular, section 3.1.2 of the text describes the image gradient.) The control unit 20 integrates the image gradient by summing the image gradient vectors about the dashed lines in the image.

As noted, if the dashed lines actually represent a border of the radio in the image, then there will be a large change in image intensity at the points comprising the dashed lines. Thus the integral of the image gradient will be relatively large. The control unit 20 compares the determined integral with a threshold value and, if the threshold is exceeded, determines that the radio 44 is present in the image and that there has been a deposit event. On the other hand, if the dashed lines do not represent a border of the radio in the image, then there will be a small change in image intensity at the points comprising the dashed lines. Thus the integral of the image gradient will be relatively small. If the control unit 20 determines that the threshold is not exceeded, it determines that the radio 44 is not present in the image and that there has been a removal event.

The threshold may be determined by the control unit 20 by integrating sample curves of a unit length at other portions of the image. As noted, the integral of a sample that corresponds to an actual border will be notably higher than samples that are not along an object boundary. The control unit 20 may select a threshold value per unit length that is between higher and lower sampled values. A threshold value is determined by multiplying the threshold value per unit length by the length of the boundary under consideration in the image (such as the length of the dashed lines representing the boundary of the radio 44 in FIG. 4).

Instead of computing the image gradient for intensity, alternatively, for color images, three image gradient integrals may be computed, one for each of the red, blue and green components. Instead of integrating the intensity gradient, the size of the gradient of each color component may be integrated and then added together for comparison.

In the above embodiment, the control unit 20 uses a threshold in the comparison with the integral of the image gradient in a stationary image subsequent to the event, as shown in FIG. 4. Alternatively, the control unit 20 may determine an integral of the image gradient for the dashed lines in a stationary image prior to the event (referred to as I(prior)) as well as the integral of the integral of the image gradient for the dashed lines in the stationary image subsequent to the event (referred to as I(subsequent)). Since there is either a deposit or removal, then one of the integrals will be of the boundary of the radio and thus relatively large, and the other integral will not be along the boundary of an object and will thus be relatively small. Therefore, if I(prior) is greater than I(subsequent), then the control unit 20 concludes that the radio was in the prior stationary image and was removed during the event. On the other hand, if I(subsequent) is greater than I(prior), then the control unit 20 concludes that the radio 44 is in the subsequent stationary image and was deposited during the event.

The above-described embodiment may be modified by using an identification technique other than the integral of the image gradient. As in the first variation of the embodiment described with respect to FIG. 4 above, the control unit 20 may consider the dashed line portion of a subsequent stationary image that represents the boundary of an object (radio 44) that has either been deposited or removed in a prior event. The control unit 20 may compare the color of one or more pixels on the interior $44_i$ of object 44 with one or more nearby pixels on the exterior interior $44_e$ of object 44. If the object 44 is absent from the subsequent stationary image, most or parts of the scene in the image corresponding to the former boundary of the radio 44 will likely be a continuous portion of another object or the background of the scene. Thus, there will be a relatively close match in the color of nearby pixels on each side of the dashed line. If there is a close match, then the control unit 20 determines that there is no object in the subsequent stationary scene and that there has been a removal event.

On the other hand, if the object (radio 44) is present in the subsequent stationary image, then there is an actual boundary at the dashed line and there will likely be a relatively large difference in the color of nearby pixels on each side of the dashed line. If there is a relatively large difference, then the control unit 20 determines that there is an object in the subsequent stationary scene and that there has been a deposit event.

The control unit 20 may compare nearby pixels on each side of the dashed line for a number of samples around the dashed line, in order to eliminate the chance that there is a close correspondence in color at a particular region despite there being a prior deposit event, or the chance that there is a large difference in color across the dashed line at a particular region despite there being a prior removal event. If the majority of samples around the dashed line indicate a large difference in the subsequent stationary image, then the control unit 20 concludes that there was a deposit event. If the majority of samples around the dashed line indicate a small difference, then the control unit 20 concludes that there was a removal event. The control unit 20 may sample other portions of the image (or prior images) to determine typical large and small differences in nearby pixels. Alternatively, the control unit 20 may use a pre-programmed number for a large difference, such as a 10% or greater change in the color over the visible spectrum.

Alternatively the control unit 20 may in like manner compare the color of one or more pixels on the interior of an object with one or more nearby pixels on the exterior of the object in a stationary image prior to the event. If there is a close match in colors on both sides of the boundary in the prior image, which indicates that there is no object present in the prior image, then the control unit 20 concludes there is a deposit event. If there is a large difference in colors on both sides of the boundary in the prior image, which indicates that there is an object present in the prior image, then the control unit 20 concludes there is a removal event.

The control unit may also compare colors of nearby pixels for both a prior and subsequent stationary image in order to achieve a more comprehensive identification of the deposit or removal of the object. This more comprehensive analysis also provides a verification of whether a deposit or removal event occurred at all. If there is a large difference in color of nearby pixels in both the prior and subsequent stationary images or a small difference in color of nearby pixels in both the prior and subsequent stationary images, then the control unit 20 determines that the type of event is inconclusive and marks the event as "object-moved".

In another variation, the control unit 20 may create and compare color histograms for pixels to the interior and exterior of the dashed line portion of a subsequent stationary image that represents the boundary of an object (radio 44) that has either been deposited or removed in a prior event. The control unit 20 may, for example, create a color histogram for a small band of pixels to the interior of the dashed line and compare it with a like color histogram created for a small band of pixels to the exterior of the dashed line. If the control unit 20 determines that the color distribution of the interior and exterior histograms correspond by greater than a threshold percentage of the overall color distribution, then the control unit 20 concludes that the image across the dashed line is substantially continuous and that there has therefore been a removal event. If, on the other hand, the control unit 20 determines that the color distribution of the histograms correspond by less than a threshold percentage of the overall color distribution, then the control unit determines that there is an actual boundary in the subsequent image and that it is therefore a deposit event.

Figure 5A:
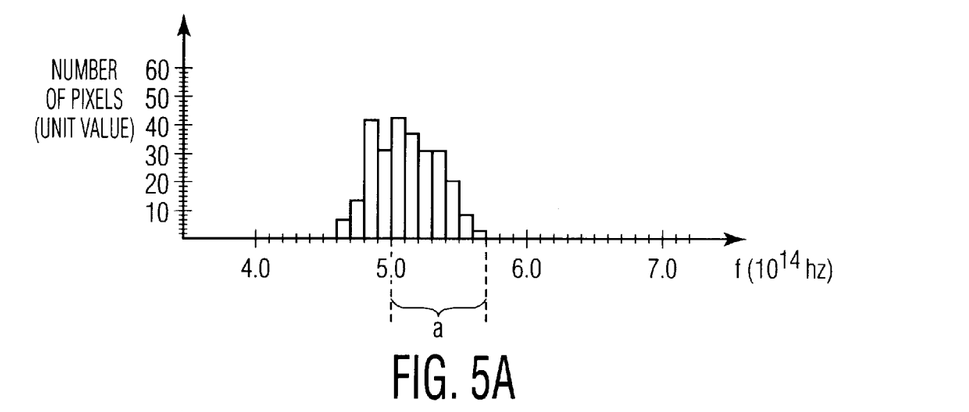
FIGS. 5a and 5b are histograms of pixels surrounding the interior and exterior of a possible boundary of an object in an image.
Figure 5B:
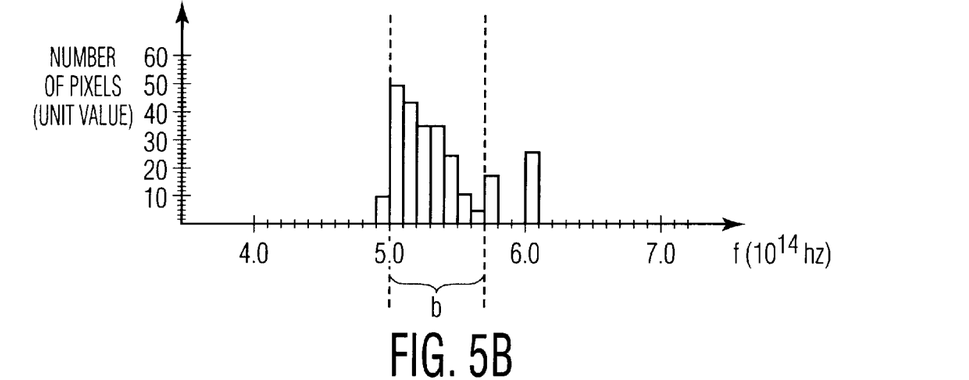

To create the histogram, each pixel considered in the histogram on one side of the dashed line may contribute a unit value at it's color frequency. For example, for creating a histogram that uses pixels from the interior of the dashed line, the control unit 20 determines the color for each pixel and adds a unit value at the color frequency in the histogram. After all pixels are considered, there is a distribution that represents the number of pixels as a function of color frequency. An example is shown in FIG. 5a. Pixels outside of the dashed line are used to create a histogram of the exterior of the dashed line, which may be as shown in FIG. 5b. The histograms are normalized (to eliminate differences due to the number of pixels used in creating each histogram) and compared. The comparison between FIGS. 5a and 5b shows that regions a and b of the interior and exterior of the dashed lines are substantially the same (for example, the color distributions correspond more than a threshold percentage of the overall distribution), thus indicating a continuum in the image across the dashed line. The control unit 20 concludes that there is no boundary for an object in the subsequent image and thus a removal event.

Again, histograms may be created and compared for a prior stationary image to determine whether there has been a deposit or removal event. For the prior image, a substantial match between histograms indicates a deposit event and a substantial difference indicates a removal event. Histograms may be created and compared for both prior and subsequent stationary images to provide further verification of the type of event, including whether an event occurred at all. Thus, if there is a substantial match between the interior and exterior histograms of the prior image and between the interior and exterior histograms of the subsequent image, then the control unit 20 identifies the type of event as "object-moved" since the results are inconclusive. If there is a substantial difference between the interior and exterior histograms of the prior image and between the interior and exterior histograms of the subsequent image, then the control unit 20 also identifies the type of event generically as "object-moved", since the results are inconclusive.

The processing provided by this embodiment may itself be used to first detect an event and then to identify the type of event, in a manner analogous to that of the previous embodiment. Thus, for example, the control unit 20 may select a first image from an incoming sequence of images. Presuming it is a stationary image, the control unit 20 may use edge detection processing to detect the edges in the image, and then, for example, determine an image gradient integral for every closed curve in the image comprised of edges that is identified as the boundary of an object (through comparison with a reference image or background modeling). At regular intervals of time thereafter the control unit 20 selects a subsequent image from the sequence, and analyzes it in like manner. The integrals of the image gradients for the first image and the subsequent image are compared for matches.

If all of the integrals in the images correspond, then the control unit 20 concludes that the image has remained stationary. The control unit 20 continues (at successive time intervals) to select and analyze subsequent images from the sequence and compare integrals of the image gradient of each subsequent image with those of the first image. Once a difference is detected (i.e., the control unit 20 finds an image gradient integral in the first image that is not found in the subsequent image, or vice versa), the control unit 20 concludes that there is motion in the image (i.e., that an event is in progress). At that point, the control unit 20 keeps track of the differences between the image gradient integrals of the first image and of the subsequent images selected and analyzed. Once the control unit 20 determines that the differences in the image gradients between the first and subsequent images is no longer changing, then it concludes that the last subsequent image selected also represents a stationary image.

Having determined both a stationary image prior to an event (i.e., the first image) and a stationary image subsequent to the event, the control unit 20 identifies the event as a removal or deposit (or inconclusive) using any of the manners of the above-embodiment. After the event is identified, the control unit 20 replaces the first stationary image with the identified subsequent stationary image and then continues to process the incoming sequence of images to detect an event.

As noted, it was initially assumed that the first image selected by the control unit 20 was stationary. If the control unit 20 does not know whether the initial image selected as the first image is stationary, it may compare the initial first image with subsequent images in the manner described above until there is no change in the difference in the image gradient integrals of the first image and the subsequent image. The subsequent image is thus stationary and the control unit 20 substitutes it as the first image and then continues processing in the manner described.

The other manners of identification of events of the above embodiments (such as the color histogram and comparison of colors) may in like manner be applied to event detection as well as event identification.

Finally, aspects of the invention may be adapted to other circumstances. For example, the system may capture images of a person carrying an object in the scene and then depositing it in the scene (a deposit event), or a person picking up an object in the scene and then carrying it through the scene (a removal event). In the first case (a deposit event), the system identifies a change portion of the subsequent stationary image, for example, by comparing it with a reference image or by using background modeling. The system may then create either a template or a histogram as described in the embodiments above, for example, of an object in the change portion. The template or histogram may be compared with images prior to the event that include the detected movement (i.e., the person carrying the object for deposit). The comparison may be made throughout the entire image or may focus on the moving portions. If the template or histogram of the object of the subsequent stationary image matches a region of the prior image, then the control unit confirms that a deposit has been made of the object.

Similarly, in the second case (a removal event), the system identifies a change portion of a prior stationary image, again, by comparing it with a reference image or by using background modeling. The system may then create either a template or a histogram as described in the embodiments above, for example, of an object in the change portion. The template or histogram may be compared with images subsequent to the event that include the detected movement (i.e., the person carrying the object that is removed). The comparison may be made throughout the entire image or may focus on the moving portions. If the template or histogram of the object of the subsequent stationary image matches a region of the subsequent image, then the control unit confirms that a removal has been made of the object.

Although various embodiments for detecting and identifying events have been separately described above, one skilled in the art will readily recognize that two or more of the techniques may also be used together to detect and/or identify events. By using multiple techniques to detect and/or identify an event, a more reliable result is achieved. Any common processing required by the two or more techniques may be consolidated for efficiency.

Although illustrative embodiments of the present invention have been described herein with reference to the accompanying drawings, it is to be understood that the invention is not limited to those precise embodiments, but rather it is intended that the scope of the invention is as defined by the scope of the appended claims.

What is claimed is:

1. A system that detects and identifies an event from a sequence of images received, the system comprising a control unit that receives and processes the sequence of images from the camera, the control unit identifying at least one stationary image prior to the event and one stationary image subsequent to the event, the control unit comparing one or more representations corresponding to one or more edges in the first stationary image with one or more representations corresponding to one or more edges in the second stationary image to determine whether an object has been deposited or removed during the event.

2. The system as in claim 1, wherein the control unit creates an outline of the first stationary image that comprises the edges in the first stationary image.

3. The system as in claim 2, wherein the control unit identifies and creates an electronic representation of edges in the second stationary image and compares the electronic representations of edges of the second stationary image and the outline of the first stationary image.

4. The system as in claim 3, wherein the control unit determines that a removal of an object has occurred when there are one or more portions of the outline of the first stationary image that have no comparable electronic representation of edges in the second stationary image.

5. The system as in claim 3, wherein the control unit determines a net length of one or more curves comprising the outline of the first stationary image and determines a net length of the one or more edges of the second stationary image and compares the net length of the one or more curves of the first stationary image with the net length of the one or more edges of the second stationary image.

6. The system as in claim 5, wherein the control unit determines that a removal of an object has occurred when the net length of the one or more curves of the first stationary image has no comparable net length of the one or more edges in the second stationary image.

7. The system as in claim 3, wherein the control unit creates one or more templates from the one or more edges of the second stationary image and compares the templates with one or more areas comprised of one or more curves comprising the outline of the first stationary image.

8. The system as in claim 7, wherein the control unit determines that a removal of an object has occurred when an area enveloped by the outline of the first stationary image is not covered by a template created from the second stationary image.

9. A system that detects and identifies an event from a sequence of images received, the system comprising a control unit that receives and processes the sequence of images from the camera, the control unit identifying at least one stationary image selected from the group of stationary images prior and subsequent to the event, the control unit analyzing an identified boundary location in the at least one stationary image to determine whether an object has been deposited or removed during the event.

10. The system as in claim 9, wherein the control unit integrates the image gradient around the identified boundary location in a subsequent stationary image and compares the integral with a threshold value to determine whether the object has been deposited or removed during the event.

11. The system as in claim 10, wherein the control unit determines that a removal event has occurred when the integral of the image gradient is less than the threshold value.

12. The system as in claim 9, wherein the control unit integrates the image gradient around the identified boundary location in a prior stationary image and compares the integral with a threshold value to determine whether the object has been deposited or removed during the event.

13. The system as in claim 12, wherein the control unit determines that a removal event has occurred when the integral of the image gradient is greater than the threshold value.

14. The system as in claim 9, wherein the control unit integrates the image gradient around the identified boundary location in each of a prior stationary image and a subsequent stationary image and compares the integrals of the prior stationary image and the subsequent stationary image to determine whether the object has been deposited or removed during the event.

15. The system as in claim 14, wherein the control unit determines that a removal event has occurred when the integral of the image gradient of the prior stationary image is greater than the image gradient of the subsequent stationary image.

16. The system as in claim 9, wherein the control unit compares the color of at least one pixel on the interior of the boundary location with the color of at least one pixel on the exterior of the boundary location to determine whether the object has been deposited or removed during the event.

17. The system as in claim 16, wherein the image is a stationary image subsequent to the event and the control unit determines that there is a removal event if the color of the at least one pixel on the interior of the boundary location differs from the color of the at least one pixel on the exterior of the boundary location by less than a threshold value.

18. The system as in claim 16, wherein the image is a stationary image prior to the event and the control unit determines that there is a removal event if the color of the at least one pixel on the interior of the boundary location differs from the color of the at least one pixel on the exterior of the boundary location by more than a threshold value.

19. The system as in claim 9, wherein the control unit compares a color histogram for a number of pixels on the interior of the boundary location with a color histogram for a number of pixels on the exterior of the boundary location to determine whether the object has been deposited or removed during the event.

20. The system as in claim 19, wherein the image is a stationary image subsequent to the event and the control unit determines that there is a removal event if the color distribution of the histogram for the pixels on the interior of the boundary location corresponds to the color distribution of the histograms for the pixels on the exterior of the boundary location by greater than a threshold value.

21. The system as in claim 19, wherein the image is a stationary image prior to the event and the control unit determines that there is a removal event if the color distribution of the histogram for the pixels on the interior of the boundary location corresponds to the color distribution of the histograms for the pixels on the exterior of the boundary location by less than a threshold value.

22. A method for detecting and identifying an event from a sequence of received images, the method comprising the steps of:
   a) identifying at least one stationary image prior to the event and one stationary image subsequent to the event,
   b) comparing one or more representations corresponding to one or more edges in the first stationary image with one or more representations corresponding to one or more edges in the second stationary image; and
   c) determining whether an object has been deposited or removed during the event based on the comparison of step b).

23. The method of claim 22, including the step of generating an outline of the first stationary image for the one or more representations corresponding to one or more edges in the first stationary image.

24. The method of claim 23, including the step of determining a net length of one or more curves of the one or more representations corresponding to one or more edges in the first stationary image and the step of determining a net length of the one or more edges of the second stationary image for use as the one or more representations corresponding to one or more edges in the second stationary image.

25. The method of claim 23, including the step of creating one or more templates from the one or more edges of the second stationary image for use as the one or more representations corresponding to one or more edges in the second stationary image.

26. A method for detecting and identifying an event from a sequence of received images, the method comprising the steps of:
   a) receiving and processing the sequence of images from the camera;
   b) identifying at least one stationary image selected from the group of stationary images prior and subsequent to the event;
   c) analyzing an identified boundary location in the at least one stationary image; and
   d) determining whether an object has been deposited or removed during the event.

27. The method of claim 26, wherein the step of analyzing an identified boundary location in the at least one stationary image comprises integrating the image gradient around the identified boundary location in an image.

28. The method of claim 27, wherein the step of determining whether an object has been deposited or removed during the event comprises comparing the integral of the image gradient with a threshold value.

29. The method of claim 26, wherein the step of identifying comprises identifying one stationary image prior to the event and one stationary image subsequent to the event, the step of analyzing comprises integrating the image gradient around the identified boundary location in the stationary image prior to the event and integrating the image gradient around the identified boundary location in the stationary image subsequent to the event, and the step of determining includes comparing the integral of the image gradient for the stationary image prior to the event with the integral of the image gradient for the stationary image subsequent to the event.

30. The method of claim 26, wherein the step of analyzing an identified boundary location in the at least one stationary image comprises determining a color of at least one pixel on the interior of the boundary location of an image with the color of at least one pixel on the exterior of the boundary of the image.

31. The method of claim 30, wherein the step of determining whether an object has been deposited or removed during the event comprises comparing the color of the at least one pixel on the interior of the boundary location with the color of the at least one pixel on the exterior of the boundary.

32. The method of claim 26, wherein the step of analyzing an identified boundary location in the at least one stationary image comprises creation of a color histogram for a number of pixels on the interior of the boundary location of an image and a color histogram for a number of pixels on the exterior of the boundary location of the image.

33. The method of claim 32, wherein the step of determining whether an object has been deposited or removed during the event comprises comparing the color histogram for the interior of the boundary location with the color histogram for the exterior of the boundary location.

\* \* \* \* \*